(No Model.) 2 Sheets—Sheet 1.

D. J. ARPIN.
DEVICE FOR MAKING ICE ROADS.

No. 381,051. Patented Apr. 10, 1888.

Witnesses
Geo. W. Young
N. E. Oliphant

Inventor
Daniel J. Arpin
By Stout & Underwood
Attorneys (No Model.) 2 Sheets—Sheet 2.

D. J. ARPIN.
DEVICE FOR MAKING ICE ROADS.

No. 381,051. Patented Apr. 10, 1888.

Witnesses
Geo. W. Lowry
N. E. Oliphant

Inventor
Daniel J. Arpin
By Stout & Underwood
Attorneys

United States Patent Office.

DANIEL J. ARPIN, OF GRAND RAPIDS, WISCONSIN.

DEVICE FOR MAKING ICE ROADS.

SPECIFICATION forming part of Letters Patent No. 381,051, dated April 10, 1888.

Application filed February 3, 1888. Serial No. 262,885. (No model.)

*To all whom it may concern:*

Be it known that I, DANIEL J. ARPIN, of Grand Rapids, in the county of Wood, and in the State of Wisconsin, have invented certain new and useful Improvements in Devices for Making Ice Roads; and I do hereby declare that the following is a full, clear, and exact description thereof.

My invention relates to devices for making ice roads; and it consists in certain peculiarities of construction and combination of parts, to be hereinafter described with reference to the accompanying drawings, and subsequently claimed.

Figure 1:
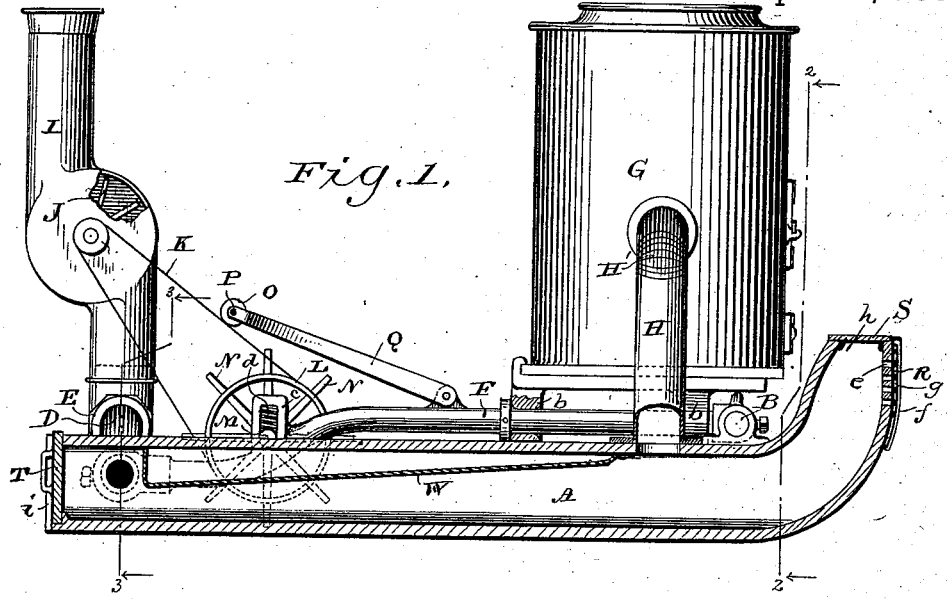
Figure 2:
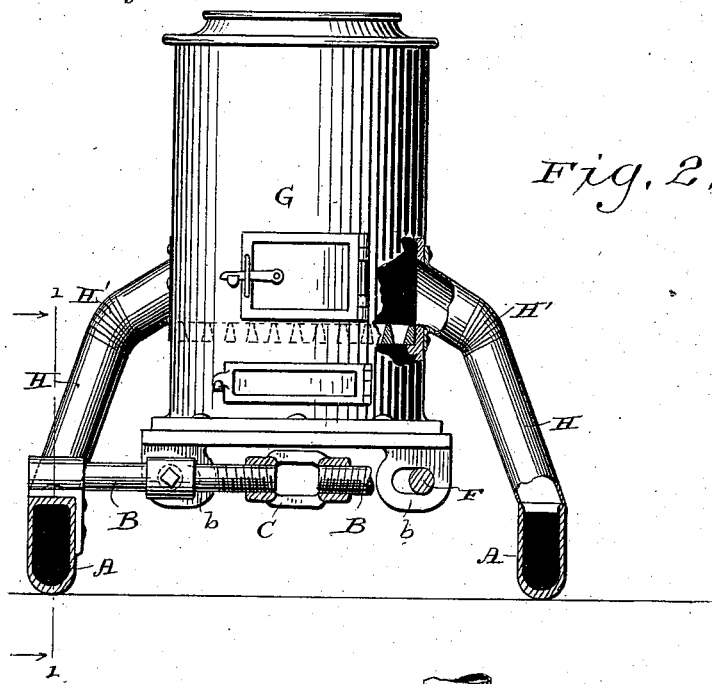
Figure 3:
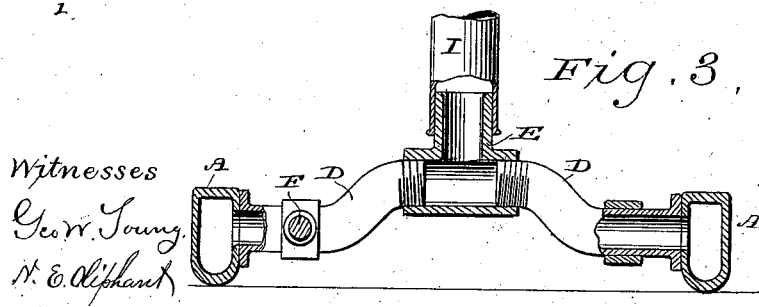
Figure 4:
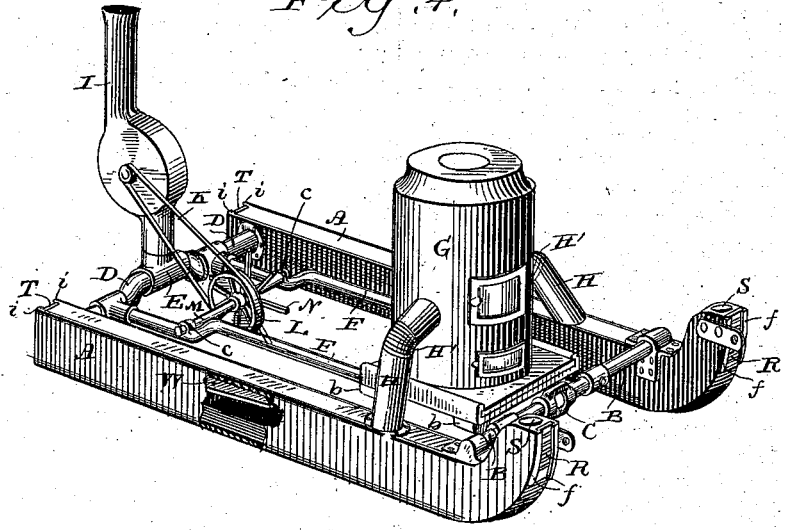

In the drawings, Figure 1 represents a side elevation, partly in section, of one form of my invention, the section being taken on line 1 1, Fig. 2; Figs. 2 and 3, vertical transverse sections, respectively taken on lines 2 2 and 3 3 of Fig. 1; and Figs. 4 and 5, perspective views showing two forms of my invention.

Referring by letter to the drawings, A A represent two hollow sled-runners that are preferably united at the front by means of a transverse rod composed of sections B B, respectively secured at their outer ends to said sled-runners and having their inner ends connected by a turn-buckle, C. At the rear each runner is preferably connected to a transverse pipe-section, D, and the opposing pipe-sections are united by a T-shaped joint, E. By the construction above described it will be seen that the sled-runners A A are adjustably connected, this being a desirable feature for the purpose of adjusting the runners to different widths of road.

Connected to the transverse front rod and rear pipe are longitudinal rods F F, that serve as supports for a heater, G, the base of said heater being provided with slotted ears $b$, that engage said longitudinal rods. Leading from the fire-place of the heater to enter the top of the runners are pipes H, provided with flexible elbows H', and connected to the T-shaped joint that unites the pipe-sections D is a smoke-stack, I, the latter being preferably provided with a blower, J, in order to increase the draft.

The blower may be of any suitable construction, and is preferably operated by a belt, K, that is driven by a pulley, L, on a transverse shaft, M, which latter has its bearings $c\ c$ on the longitudinal rods F F, and is provided with spokes N, whose contact with the snow causes said shaft to revolve.

As there are often stumps, stones, or other obstructions in the path of the sled, it is necessary to provide some means whereby the spokes N may yield to such obstructions when coming in contact therewith. I have therefore shown in Fig. 1 the bearings $c\ c$ for the shaft M as elongated, and a spring, $d$, arranged in each bearing to hold said shaft in its normal position. Should the spokes N come in contact with an obstruction, the spring $d$ will yield and permit a vertical movement of the shaft M, whereby said spokes are raised to clear the obstruction, and the parts automatically return to their normal position when said obstruction is passed.

In order to take up slack in the belt K, when the shaft M moves in its bearings, I provide a belt-tightener that consists of a pulley, O, arranged on a spindle, P, that has loose bearings in arms Q, pivotally connected to the longitudinal arms F F, as shown in Fig. 1; but I do not confine myself to any particular construction or arrangement of belt-tightener.

The curved front ends of the runners A A are preferably provided with draft-openings $e$ and guides $f$ for sliding plates R, that are also provided with draft-openings $g$, designed to be brought in and out of register with the openings in said runners. At the extreme upper end, or any other suitable point, each runner is also preferably provided with an opening, $h$, that is covered by a plate, S, and the rear end of each runner is preferably left open, to be closed by a door, T, that slides in guides $i$, as best illustrated in Fig. 1.

In place of the heater G, I may use a boiler, and by suitable connections, such as any practical mechanic would employ, conduct steam or hot water into the runners A A, the several openings in the latter being made steam-tight; and it is obvious that in this form of my invention the smoke-stack I would be removed and the outlet of the T-shaped joint E, connecting the pipe-sections D, would be closed by a suitable steam-tight cap.

Figure 5:
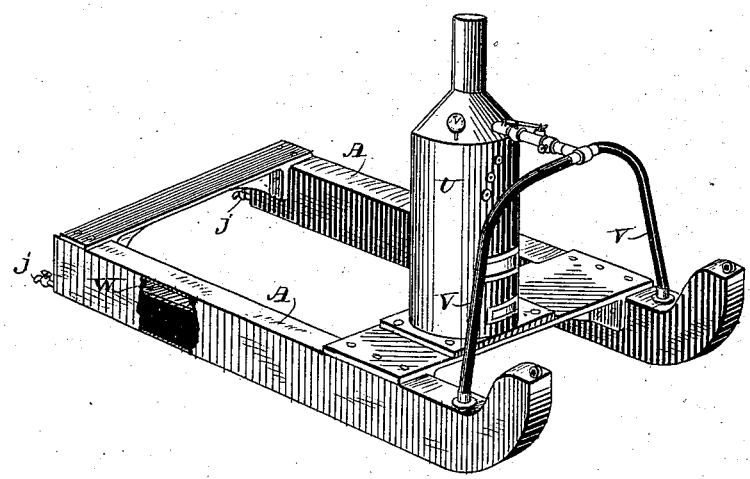

In Fig. 5 I show a sled having the hollow runners A A rigidly connected to each other and a boiler, U, mounted on a cross-piece that unites the front portions of said runners. The boiler U is shown as having a steam-connection, V, with the runners; but it is obvious that the connection may be arranged in such a manner that I can use hot water instead of steam to heat the runners; and in either case each runner is preferably provided at its rear end with a valve or faucet, $j$, through which to drain off the waste water.

The sled shown in Fig. 5 is an economical one and may suit the purpose in a number of instances; but I prefer a construction similar to that described in connection with the preceding figures, in order that I may adjust the runners in a lateral direction to accommodate my device to different widths of roads it may be desirable to make, there being oftentimes a difference in the width of the hauling-sleds for which the ice roads are made.

In the operation of the adjustable form of my device on which a heater may be employed the products of combustion of said heater are drawn through the pipes H into the hollow runners to heat the latter, and finally escape through the pipe-sections D and T-shaped joint E into the smoke-stack I, the draft being accelerated by the blower J. The products of combustion in their passage through the runners are deflected by the plates W, to obtain the greatest amount of heat at the point of contact of these runners with the snow, so that the latter may be readily melted in the path of said runners, the water caused by this melting being afterward frozen to make an ice road, and it will be understood that the deflecting plates are also preferably employed when steam is used to heat the runners.

It will be observed that the pipe-sections D are for a portion of their length down close to the snow-line, and thus the heat from these pipe-sections will also melt the snow, and thus when the water caused by this melting becomes frozen there will be an ice road for the horses attached to the hauling-sleds.

Instead of merely drawing the products of combustion from the heater through the runners, as above described, I may, in addition thereto, cause live coals from said heater to descend through the pipes H into said runners and supply the fire thus made in these runners with fresh fuel through the open rear ends thereof or through the openings $h$.

Instead of employing the heater, I may build the fire directly in the runners, and at any time it is desirable to increase the draft I bring the plates R to such a position that the openings $g$ therein are in register with the openings $e$ in said runners.

As the main object of my invention is to provide a device whereby the snow may be melted by means of a heated surface coming in direct contact therewith, I do not wish to be understood as limiting myself to any particular means for heating the hollow sled-runners, and I have therefore shown and described several ways of accomplishing this result.

Having thus fully described my invention, what I claim as new, and desire to secure by Letters Patent, is—

1. A device for making ice roads, that comprises a sled having hollow runners interiorly provided with deflecting plates, and means, substantially as described, for heating said runners, whereby snow may be melted by contact therewith, as set forth.

2. A device for making ice roads, that comprises a sled having hollow runners interiorly provided with deflecting plates, a heater arranged on the sled, pipes connecting the runners and heater, and a smoke stack also connected to the runners, whereby the products of combustion are drawn through said runners to heat the same, substantially as set forth.

3. A device for making ice roads, that comprises a sled having hollow runners, a heater arranged on the sled, pipes connecting the runners and heater, a smoke-stack also connected to the runners, and a blower for increasing the draft, substantially as set forth.

4. A device for making ice roads, that comprises a sled having hollow runners, a heater arranged on the sled, pipes connecting the runners and heater, a smoke-stack also connected to the runners, a blower arranged in the smoke-stack, and a shaft having a belt-connection with the blower and provided with spokes that come in contact with the surface over which the sled passes to impart motion to said shaft, substantially as set forth.

5. A device for making ice roads, that comprises a sled having hollow runners, a heater arranged on the sled, pipes connecting the runners and heater, a smoke stack also connected to the runners, a blower arranged in the smoke stack, a shaft arranged to have vertical play in its bearings and belt-geared to the blower, spokes arranged on the shaft to come into contact with the surface over which the sled passes to impart motion to said shaft, and a suitably-arranged belt-tightener, substantially as set forth.

6. A device for making ice roads, that comprises a sled having hollow runners open at their rear ends and provided at their front ends with draft-openings, a smoke-stack connected to the runners, and cut-off plates for the rear ends and draft-openings of said runners, substantially as set forth.

7. A device for making ice roads, that comprises a sled having hollow runners open at their rear ends and each runner provided with a top opening, front-draft openings, and cut-off plate for its open rear end, substantially as set forth.

In testimony that I claim the foregoing I have hereunto set my hand, at Grand Rapids, in the county of Wood and State of Wisconsin, in the presence of two witnesses.

DANIEL J. ARPIN.

Witnesses:
EDMUND P. ARPIN,
GEO. L. WILLIAMS.